US009722930B2

(12) United States Patent
Cucinotta et al.

(10) Patent No.: US 9,722,930 B2
(45) Date of Patent: Aug. 1, 2017

(54) EXPLOITING PROBABILISTIC LATENCY EXPRESSIONS FOR PLACING CLOUD APPLICATIONS

(71) Applicant: ALCATEL-LUCENT, Paris (FR)

(72) Inventors: Tommaso Cucinotta, Dublin (IE); Chang Fangzhe, Edison, NJ (US); Ramesh Viswanathan, Manalapan, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 714 days.

(21) Appl. No.: 14/075,727

(22) Filed: Nov. 8, 2013

(65) Prior Publication Data

US 2015/0134823 A1    May 14, 2015

(51) Int. Cl.
*G06F 15/173* (2006.01)
*G06F 15/16* (2006.01)
*H04L 12/851* (2013.01)

(52) U.S. Cl.
CPC ................. *H04L 47/2425* (2013.01)

(58) Field of Classification Search
CPC . H04L 47/2425; H04L 41/5019; H04L 63/10; H04L 67/10; H04L 67/34; H04L 67/70; H04L 41/5003; H04L 41/5096
USPC ................ 709/226, 219, 229, 232
See application file for complete search history.

(56) References Cited

U.S. PATENT DOCUMENTS

| | | | |
|---|---|---|---|
| 2011/0276951 A1* | 11/2011 | Jain | G06F 11/3006 717/140 |
| 2012/0203888 A1* | 8/2012 | Balakrishnan | G06F 9/505 709/224 |
| 2014/0195673 A1* | 7/2014 | Cook | H04L 41/5025 709/224 |

OTHER PUBLICATIONS

Chang, Fangzhe, "Placement in Clouds for Applicaton-Level Latency Requirements", 2012 IEEE Fifth International Conference on Cloud Computing, 2012, 327-335.
Jiang, Joe W. et al., "Joint VM Placement and Routing for Data Center Traffic Engineering", INFOCOM, 2012 Proceedings IEEE, vol., No. Mar. 25-30, 2012, 2876-2880.

(Continued)

*Primary Examiner* — Ario Etienne
*Assistant Examiner* — Sahera Halim
(74) *Attorney, Agent, or Firm* — Kramer & Amado, P.C.

(57) ABSTRACT

Various exemplary embodiments relate to a method for placing components of a plurality of instances of a cloud application on nodes in a cloud infrastructure, the method including: receiving scenario probabilities of a plurality of cloud application scenarios, wherein the plurality of cloud application scenarios define the modes of operation of the cloud application; receiving cloud infrastructure performance data; defining a performance metric of the cloud application based upon cloud infrastructure performance data; defining constraints on the placement of the application components; receiving a service level agreement performance requirement based upon a probability; optimizing the placement of the components of the plurality of instances of the cloud application on nodes in the cloud infrastructure based upon the scenario probabilities, cloud infrastructure performance data, the performance metric, and the constraints on the placement of the application components to meet the service level agreement performance requirement.

20 Claims, 5 Drawing Sheets

(56) References Cited

OTHER PUBLICATIONS

Konstanteli, Kleopatra , "Admission Control for Elastic Cloud Services", Proceedings of the 5th IEEE International Conference on Cloud Computing (IEEE Cloud 2012), Honolulu, Hawaii, USA, Jun. 24-29, 2012.
Konstanteli, Kleopatra , "Optimum Allocation of Distributed Service Workflows with Probalistic Real-Time Guarantees", Springer Service Oriented Computing and Appilcations, vol. 4, No. 4, Dec. 2010, 1-24.
Kousiouris, George , "The effects of scheduling, workload type and consolidation scenarios on virtual machine performance and their prediction through optimized artificial neural networks", Elsevier Journal of Sstems and Software (JSS), DOI 10.1016/j.jss.2011.04.013, 2011.
Voith, Thomas et al., "Interactive Realtime Multimedia Applications on Service Oriented Infrastructures", ISONI Whitepaper ICT FP7-214777 WP 6/7, ALUD/USTUTT and other partners of the IRMOS consortium, Jul. 2009, 1-25.
Zhang, Fan et al., "Provisioning Virtual Resources Adaptively in Elastic Computer Cloud Platforms", International Journal of Web Services Research (IJWSR), vol. 8, No. 3, 2011.

\* cited by examiner

EXPLOITING PROBABILISTIC LATENCY EXPRESSIONS FOR PLACING CLOUD APPLICATIONS

TECHNICAL FIELD

Various exemplary embodiments disclosed herein relate generally to cloud computing.

BACKGROUND

Cloud applications are becoming more widely used and provide important services to users of these cloud applications. It is important for cloud application providers and hence the cloud infrastructure providers to host cloud applications in a way the meets various performance requirements. Such performance requirements ensure a positive user experience for the user of the cloud application.

The relationships between the user, cloud application provider, and cloud infrastructure provider mean that the user may be a customer of the application provider, and the application provider may be a customer of the cloud infrastructure provider. In certain cloud application deployments the cloud application provider and cloud infrastructure provider may be the same entity. In any of these customer/service provider relationships a service level agreement (SLA) may be implemented to specify certain performance requirements to ensure a desired user experience. Accordingly, the cloud application may be deployed in a manner to meet the SLA requirements.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for placing components of a plurality of instances of a cloud application on nodes in a cloud infrastructure, the method including: receiving scenario probabilities of a plurality of cloud application scenarios, wherein the plurality of cloud application scenarios define the modes of operation of the cloud application; receiving cloud infrastructure performance data; defining a performance metric of the cloud application based upon cloud infrastructure performance data; defining constraints on the placement of the application components; receiving a service level agreement performance requirement based upon a probability; optimizing the placement of the components of the plurality of instances of the cloud application on nodes in the cloud infrastructure based upon the scenario probabilities, cloud infrastructure performance data, the performance metric, and the constraints on the placement of the application components to meet the service level agreement performance requirement.

Various exemplary embodiments relate to a cloud controller method for placing components of a plurality of instances of a cloud application on nodes in a cloud infrastructure the cloud controller including: a network interface; a memory; and a processor in communication with the memory, the processor being configured to: receive scenario probabilities of a plurality of cloud application scenarios, wherein the plurality of cloud application scenarios define the modes of operation of the cloud application; receive cloud infrastructure performance data; define a performance metric of the cloud application based upon cloud infrastructure performance data; define constraints on the placement of the application components; receive a service level agreement performance requirement based upon a probability; optimize the placement of the components of the plurality of instances of the cloud application on nodes in the cloud infrastructure based upon the scenario probabilities, cloud infrastructure performance data, the performance metric, and the constraints on the placement of the application components to meet the service level agreement performance requirement.

Various exemplary embodiments relate to a non-transitory machine-readable storage medium encoded with instructions for execution by a cloud controller for placing components of a plurality of instances of a cloud application on nodes in a cloud infrastructure, the medium including: instructions for receiving scenario probabilities of a plurality of cloud application scenarios, wherein the plurality of cloud application scenarios define the modes of operation of the cloud application; instructions for receiving cloud infrastructure performance data; instructions for defining a performance metric of the cloud application based upon cloud infrastructure performance data; instructions for defining constraints on the placement of the application components; receiving a service level agreement performance requirement based upon a probability; instructions for optimizing the placement of the components of the plurality of instances of the cloud application on nodes in the cloud infrastructure based upon the scenario probabilities, cloud infrastructure performance data, the performance metric, and the constraints on the placement of the application components to meet the service level agreement performance requirement.

BRIEF DESCRIPTION OF THE DRAWINGS

In order to better understand various exemplary embodiments, reference is made to the accompanying drawings, wherein.

To facilitate understanding, identical reference numerals have been used in the Figures and the text to designate elements having substantially the same or similar structure or substantially the same or similar function.

Herein, various embodiments are described more fully by the Figures and the Detailed Description. Nevertheless, the inventions may be embodied in various forms and are not limited to the specific embodiments that are described in the Figures and Detailed Description.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Ensuring stable and predictable performance of cloud applications is a challenging and important problem. Indeed, the growing interest in deploying interactive cloud applications in cloud infrastructures, including distribution and on-line co-authoring of multimedia contents, gaming, virtual desktops and other professional applications traditionally used on a local personal computer (PC), poses more and more challenging requirements on the overall cloud computing "supply chain," including Software-as-a-Service (SaaS), Platform-as-a-Service (PaaS) and Infrastructure-as-a-Service (IaaS) providers. These providers need to host and deploy heavily distributed cloud applications over their physical infrastructures with precise Quality-of-Service (QoS) requirements, such as end-to-end latency, adhering to well-formalized service level agreements (SLAs) to be established with customers.

An issue yet to be properly addressed in this context is the placement of a distributed cloud application ensuring probabilistic guarantees on its end-to-end latency behavior, in a geographically distributed physical infrastructure (e.g., multiple data centers spread across the territory).

Figure 1:
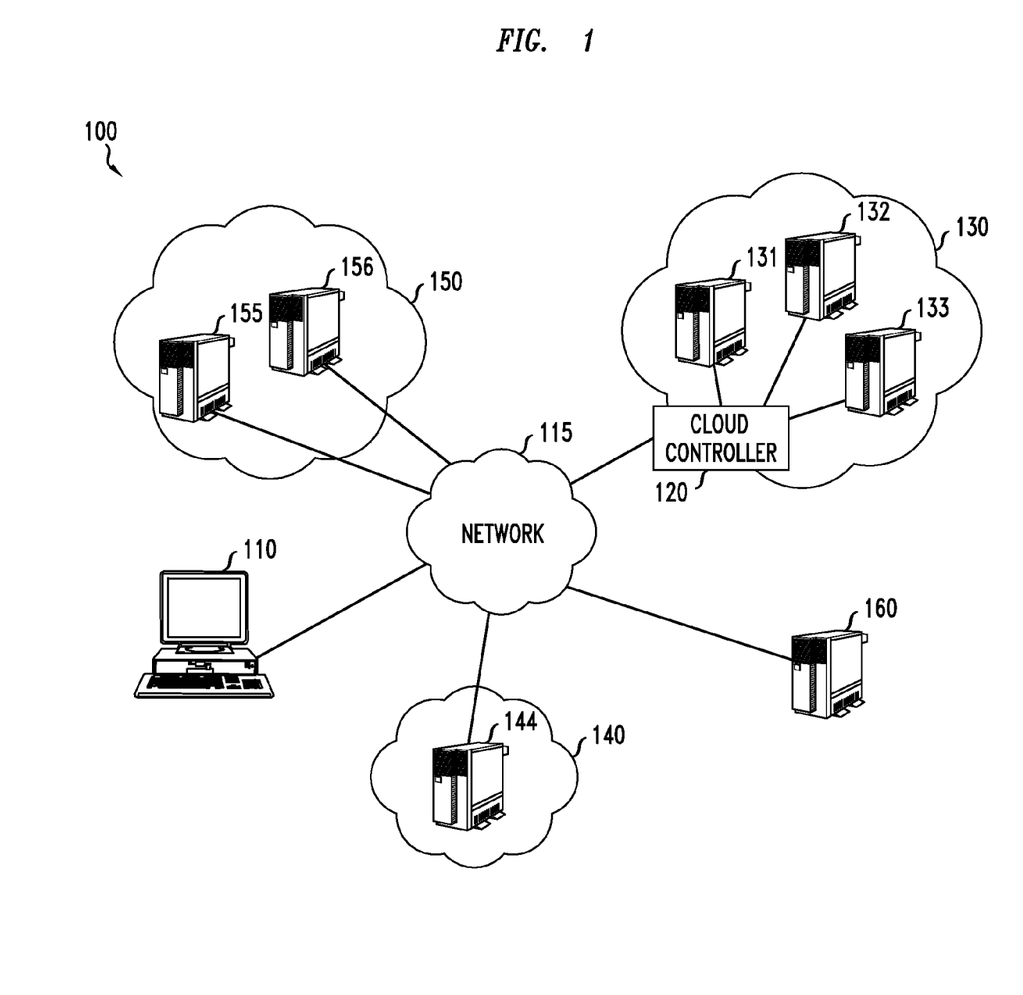
FIG. 1 illustrates an exemplary cloud architecture for providing cloud computing.

FIG. 1 illustrates an exemplary cloud architecture for providing cloud computing. The cloud architecture 100 may implement a networked cloud architecture and may include a client device 110, a network 115, a cloud controller 120, data centers 130, 140, 150, and a cloud application provider 160.

The client device 110 may be any device configured to utilize one or more cloud resources. In various embodiments, the client device 110 may be a desktop computer, laptop, tablet, mobile device, server, or blade. The client device 110 may communicate with other devices, such as the cloud controller 120, via the network 115. The client device 110 may represent a device of a customer that requests access to a distributed cloud application provided by the cloud application provider 160 from the cloud controller 120. It will be apparent that multiple additional client devices (not shown) may be in communication with the network 115 and such additional client devices may belong to additional customers.

The network 115 may be any network of devices or transmission media capable of enabling communication between the various devices of the exemplary cloud architecture 100. For example, the network 115 may include numerous devices configured to exchange and route data packets toward various destinations. In various embodiments, the network 115 may include the Internet or one or more carrier networks.

The cloud controller 120 may be a device configured to control the operations of a networked cloud. The cloud controller 120 may include various hardware such as a storage device, memory, or one or more processors. As used herein, the term "processor" will be understood to encompass a variety of devices such as microprocessors, field-programmable gate arrays (FPGAs), application-specific integrated circuits (ASICs), and other similar processing devices. In various embodiments, the cloud controller 120 may include, for example, a server, a blade, a personal computer, a laptop, a tablet, or a mobile device. In some such embodiments, the cloud controller 120 may be a virtual machine that utilizes cloud resources such as, for example, the hardware resources provided by cloud devices 131, 132, 133. The cloud controller 120 may reside at a data center, such as data center 130, or may reside elsewhere. The cloud controller 120 may perform various cloud management functions, including management of cloud resource allocation and application deployment. As such, the cloud controller 120 may receive requests for the establishment of cloud applications from a cloud application provider 160. Upon receiving such requests, the cloud controller 120 may allocate requested resources from one or more of the cloud devices 131, 132, 133, 144, 155, 156, for use by client devices. In various embodiments, the exemplary cloud architecture 100 may include multiple cloud controllers (not shown). Various techniques for coordinating the operation of multiple cloud controllers will be apparent.

The data centers 130, 140, 150 may each be locations supporting one or more devices that provide cloud resources. For example, data center 130 may host cloud devices 131, 132, 133; data center 140 may host cloud device 144; and data center 150 may host cloud devices 155, 156. The data centers 130, 140, 150 may be geographically distributed or may be situated at different network distances from the client device 110. For example, the client device 110 may be located in Washington, D.C., data center 140 may be located in Chicago, data center 150 may be located in Paris, and data center 130 may be located in Tokyo. According to this example, the client device 110 may experience less network latency when communicating with data center 140 than when communicating with data center 130. It will be apparent that the cloud architecture 100 may include numerous additional data centers (not shown) and that each data center may include any number of cloud devices.

Each of cloud devices 131, 132, 133, 144, 155, 156 may be a device configured to provide cloud resources for use by cloud applications. In various embodiments, each of the cloud devices 131, 132, 133, 144, 155, 156 may be a desktop computer, laptop, tablet, mobile device, server, or blade. As such, the cloud devices 131, 132, 133, 144, 155, 156 may include various hardware such as, for example, storage devices, memory, or one or more processors. The cloud devices 131, 132, 133, 144, 155, 156 may be configured to provide processing, storage, memory, VMs, or groups of VMs for use by client devices such as the client device 110.

In various embodiments, such as the embodiment illustrated in FIG. 1, the cloud controller 120 may include or interface with an application manager (not shown) to deploy and subsequently scale a cloud application with demand. The application manager may be, for example, a desktop computer, laptop, tablet, mobile device, server, or blade and may include a virtual machine.

The initial placement of various components of the cloud application will directly affect the performance of the cloud application relative to the SLA performance requirements. Accordingly, described below are embodiments of methods and systems for implementing a mechanism by which a cloud computing provider accepts requests to host and deploy complex cloud applications including multiple interacting application components. These application components may include computing elements, network elements, and data storage, including both components to place and components already placed within the infrastructure (e.g., VMs hosting application components that have to be placed, and/or storage/database services already available at specific physical locations within the cloud provider infrastructure). The cloud provider may accept requests to deploy distributed cloud applications, in the form of arbitrary graphs of computations, considering probabilistic variability in both application workloads and the structure of the needed interactions among components. Specifically, an application specification may be accompanied by a set of probabilistic sequence diagrams or scenarios, characterizing the probability that requests propagate between the various components, leading to computations and communications whose resource requirements may be known on a statistical/probabilistic basis. Also, a model may be considered for probability variations along with available horizontal and vertical scalability options for the components to deploy (e.g., impact on probabilities of per-VM memory or number of replicas/VMs) while at the same time managing to provide probabilistic guarantees on the end-to-end performance of the application. These probabilistic guarantees may be useful in establishing SLAs between customers and providers.

Figure 2:
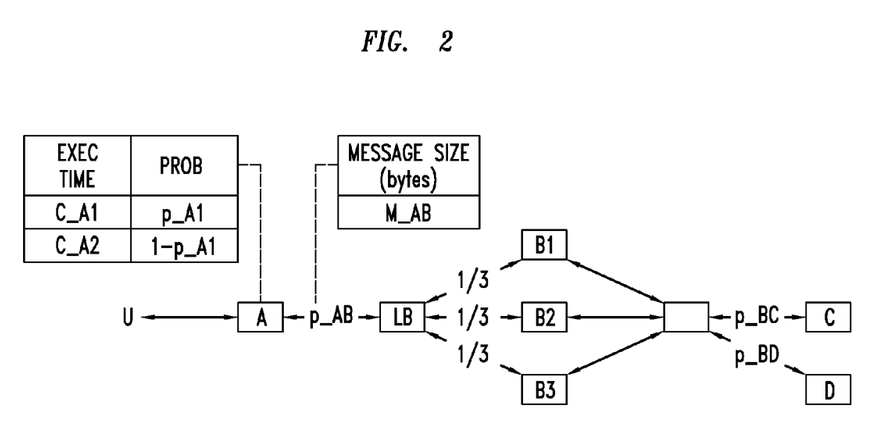
FIG. 2 illustrates an example of an application graph.

FIG. 2 illustrates an example of an application graph. A request from a user U reaches a front-end web service A, and then it is propagated to a horizontally scalable back-end service B via a load balancer LB and in this example is instantiated three times B1, B2, B3. Then the request may propagate to either component C or D, depending on the nature of the request. A request may be propagated to B via the load balancer LB mediating the interaction with the instances of B. This scenario may occur with some probability p_AB. Alternatively, the request reaching A might be served directly by A without any further interaction with the corresponding complementary probability 1−p_AB. With the load balancer LB, requests propagating from A towards B may be fairly split among the instances B1, B2 and B3, if they have the same capacity/throughput. Similarly, requests submitted to B might be served without moving to C nor D. Alternatively, a request forwarded by B may have to be processed either by C or D, and the associated probabilities with these different paths may be specified p_BC or p_BD. Accordingly, various scenarios of the cloud application may be defined. Each scenario may correspond to a specific mode of operation of the cloud application indicating the components used as well as the order of operation of the components.

Additionally, individual software components (A, B, C and D in the example) may be present leading to additional alternatives for the computing requirements that are also associated with known or estimated corresponding probabilities of occurrence. For example, in the above application case, the service A may be associated with two execution time estimations C_A1 and C_A2, each one likely to occur with some specified probability p_A1 and 1−p_A1.

Because a user request may not always follow an exactly identical path through the deployed components, the specification of probabilistic end-to-end latency requirements may be defined in the following terms.

A scenario may be defined by a probabilistic message chart specifying the topology of computations possibly triggered by a user request, along with the specification of the probabilities that each path may be taken, along with the specification of the bandwidth requirements and the number of round-trips among components to be expected for each of said interactions (e.g., if we consider the 3-way handshake for opening a TCP/IP connection, then the corresponding latency among deployment locations of said components has to be correspondingly weighted by a multiplication factor). Further, each path may be accompanied by the specification of the computing latency estimated at each computing node. Also, the same path may also be specified multiple times with different computing requirements.

Each probabilistic message chart may be accompanied by a SLA specification, in terms of probability that the end-to-end interaction satisfies some latency (and/or other QoS) constraint. Components to be hosted within the infrastructure may be associated with additional resource requirements specification (such as amount of RAM or HD storage), if needed. Computing requirements may be specified either according to some normalized/standardized reference architecture (e.g., 20 ms of execution on a CPU X running at 2 GHz), or we may refer to a simplified metric such as GHz equivalent, or as a set of clearly specified benchmark figures (e.g., number of DCT/FFT transforms and the like) in the most complex case.

The method described in the embodiments below allow the provider to automatically find a best match among resource allocation and VM placement, so as to respect the required QoS/latency constraints at the SLA level. Furthermore, the provider may iteratively, incrementally and dynamically change deployment options so as to account for additional and/or more refined information, among the elements mentioned above, as made available through proper monitoring actions and/or direct interaction with the application (if allowed), through a proper API (e.g., dynamic changes in the probabilities of occurrence of the various paths within the probabilistic sequence diagram specification, as due to changes in the internal application status).

An embodiment of the placement method may be described with reference to the simple scenario depicted in FIG. 2. The probabilistic application chart may be defined as follows. The application chart may specify a set of application components. The location for some of the application components may already be known, but for others the location may be left as a variable. The application chart may also include a linear sequence of (resource consumption) actions to be performed by the various application components including message transmissions from component/VM to component/VM and computing actions.

Further, for each action, the application chart may include a specification of the amount of consumed resource for each user's request. For example the application chart may specify: the estimated execution time due to processing; the amount of data to be transmitted to the next application component, and the multiplier of the associated latency expression term, e.g., if the latency among the corresponding communicating components (ultimately depending on the placement decision of the provider) has to be accounted for just once (the default) or more than once. A probability of occurrence of each end-to-end scenario may be described within the probabilistic message chart.

For the sake of simplicity, the specification of the behavior of the application in response to each individual user request may be provided in different ways, using various modeling tools including UML state diagrams, message chart diagrams, Petri Nets, or others. In such cases, the probability of occurrence of each end-to-end scenario needs to be accordingly computed considering the assumptions behind the model (e.g., assumption of independence among all probabilistically modeled choice points may be an easy and common situation).

For example, a simple multi-tier linear workflow model might capture the scenario depicted above in FIG. 2, where a probability p_AB would be associated with the probability for a request from the user reaching A to propagate to B and accordingly a probability of 1−p_AB to not propagate from A and to go back to the user right after the computing made by A. Further, probabilities p_BC and p_BD may similarly model the probability for a request from B to propagate to either C or D, and accordingly, a probability of 1−p_BC−p_BD to not propagate after the computing made by B, namely made by either B1 or B2 or B3. Note that it is also possible to specify different computing requirements for computing nodes in the cases where the request is served locally or propagated forward. The overall end-to-end scenarios, along with their corresponding end-to-end probability of occurrence, are easily computed as follows where the path from the user to the application and back to the user is shown:

U→A→U:
  End-to-end probability of (1−p_AB).
U→A→LB→B1→A→U
U→A→LB→B2→A→U
U→A→LB→B3→A→U:
  End-to-end probability of p_AB*(⅓)*(1−p_BC−p_BD) (for each case)
U→A→LB→B1→C→B1→A→U
U→A→LB→B2→C→B2→A→U
U→A→LB→B3→C→B3→A→U:
  End-to-end probability of p_AB*(⅓)*p_BC (for each case)
U→A→LB→B1→D→B1→A→U
U→A→LB→B2→D→B2→A→U
U→A→LB→B3→D→B3→A→U:
  End-to-end probability of p_AB*(⅓)*p_BD (for each case)

Note that in this example each scenario is characterized by potentially different computing actions and associated computing times involved in the linear workflow (e.g., the presence or absence of further processing actions, and/or change of the type of action such as when the request follows either the C or the D path). Similarly, one may reuse the same model to associate probability mass functions to the computing, communication and storage access actions and to create further sub-scenarios accordingly.

Further, consider that the computing element A has a probability of p_A1 to compute within C_A1 time units, and a probability (1−p_A1) to compute within C_A2 time units. Clearly, this situation is equivalent to modifying the above workflow with a message reaching from U a logical computing element A1 with probability p_A1 and another logical computing element A2 with probability (1−p_A1). As a consequence, the first end-to-end scenario enumerated above would now be as follows:

U→A1→U:
  End-to-end probability of p_A1*(1−p_AB):
U→A2→U:
  End-to-end probability of (1−p_A1)*(1−p_AB)

However, in the provider's decision about placement of the requested workflow, A has to be handled as a single action to be placed of course, so this constraint has to be added in the placement problem formulation.

Another common example specifying the component execution time may be to use one of multiple known percentiles of the component execution time distribution (as opposed to an exactly known probability mass function). For example, for component A, we may know that that probability that the execution time of A is less than aN as follows:

Pr{A<=a1}=0.7;
Pr{A<=a2}=0.9;
Pr{A<=a3}=1.0.

This scenario may be transformed into the above considered one (basically deriving the upper-bounded probability mass function corresponding to the specified percentiles) by introducing three logical components A1, A2 and A3 with execution times of a1, a2 and a3 respectively, and with associated three paths with probability of occurrence of 0.7, 0.2 (i.e., 0.9−0.7) and 0.1 (i.e., 1.0−0.9), respectively, as follows:

U→A1→U:
  End-to-end probability of 0.7*(1−p_AB)
U→A2→U:
  End-to-end probability of 0.2*(1−p_AB)
U→A3→U:
  End-to-end probability of 0.1*(1−p_AB)

Clearly, the enumeration in the example above may be extended across all the possibilities for A with all the other possibilities in terms of the request stopping at B, or proceeding towards C or D etc. This kind of reasoning is simple under assumptions of independence of occurrence of the various choice points.

Note further that the above constitutes just an example, and alternative embodiments may include methods using dependent probabilities. For example, if the probabilities of going forward from B to C and/or from B to D are anyway influenced or have correlation with which event has occurred among A1 or A2, then this may be properly modeled and ultimately result in an enumeration of all the paths with the associated overall end-to-end probabilities.

Now consider an example of the SLA specification that specifies that the overall end-to-end interaction respects an end-to-end latency less than or equal to a maximum amount L_SLA with at least a probability of P_SLA. One possible way to achieve such a guarantee for the provider is the following.

For example, by focusing on networking and computing (and neglecting storage access), the cloud application placement may be determined by:

a) employing internal resource reservation techniques that allow the reservation of specific amounts of computing power and network bandwidth;

b) considering a minimum inter-arrival period among requests to the distributed application, and dimensioning the resources allocation so as to ensure the non-enqueueing of multiple requests—so that the overall end-to-end response-time of the distributed application or service may easily be modeled; and c) considering an instantiation of the collective latency expression problem.

The additive latency expressions may also account for a model of the delay introduced in the workflow by computing actions. By assuming a computing requirement of C, and a scalable computing power made available (and reserved) to the VM of U, then the corresponding delay may be roughly estimated as C/U (e.g., if half of the computing power is made available to the VM, then its computations are expected to last for twice as long). Such a model might also be representative of the decreased queuing delay incurred by requests when increasing the reserved/available computing power. An alternate finer-grained model for computing delays exploiting real-time scheduling at the hypervisor/host-OS level may also be used as known in the art.

The collective latency expression may also account for a model of the further delay possibly added by significant amounts of data being exchanged among application components. For example, if M bytes have to be transmitted, and one can rely on a reserved bandwidth of B for the communication, then a further delay of M/B has to be added to the pure networking delay.

Then the provider may select a subset of the overall enumerated end-to-end scenarios whose probabilities of occurrence sum up to at least the minimum probability P_SLA as stated in the SLA, and it has to constrain all of these additive expressions, to have a deadline of L_SLA as stated in the SLA. In order to determine an optimum choice, the provider may actually consider the exact subset of scenarios to consider as a further unknown of the problem, and ultimately employ a Boolean Linear Programming solver (with expanded variables) in order to compute not only the optimum allocation/deployment options, but also the associated scenarios used to respect the end-to-end SLA.

In the first two steps described above, the scalability options U (for the computing) and B (for the networking) are constants of the problem which depend on the specific available resources considered by a deployment option, namely depending on the unreserved computing capacity U available on the physical hosts being considered for deployment of each application component and depending on the unreserved bandwidth B available among physical locations being considered for deployment of each pair of communicating application components, as identified in the various probabilistic end-to-end sequence diagrams.

Now a detailed embodiment of the formulation of an optimal placement problem may be formalized as detailed in the following description.

Consider a set of applications A to be accessed by a number of users U, and a set of data centers V, assumed to contain homogeneous machines (the case of heterogeneous processors may be handled as well, but it is not shown to keep the discussion and notation simpler). Furthermore, consider a set of inter-connected locations L, including both data centers locations $L_V$ and users locations $L_U$ where $L=L_V \cup L_U$.

Each application $a \in A$ may include:
a) a minimum inter-arrival period $T_a$ for requests submitted to the application as a whole (this defines the maximum request rate);
b) a set of components $A_a$ to be placed in one or more data centers; each component $i \in A_a$ is characterized by a storage requirement $S_{a,i}$ expressed as needed number of bytes in the local storage of each computing machine for the component to be deployed and operate correctly;
c) a set of end-to-end latency expressions $E_a$ where each expression $e \in E_a$ is characterized by:
  a list of components $A_{a,e} \subset A_a$ to be activated one after another for each user request, in the scenario represented by the expression e;
  each activated component i needs a computing time $C_{a,i,e}$ expressed as needed computing time for each activation of the component, in the context of the considered latency expression e;
  networking requirements $M_{a,i,e}$ expressed as number of bytes to be transmitted to the next component in the probabilistic latency expression, and number of required round-trip interactions $r_{a,i,e}$ between the component and the next one in the associated scenario;
  a probability $\phi_{a,e}$ of occurrence of the scenario represented by the expression, namely the probability that all the components in $A_{a,e}$ are activated triggering the computations and communications as summarized by the $\{C_{a,i,e}\}$, $\{M_{a,i,e}\}$ and $\{r_{a,i,e}\}$ parameters;

d) an end-to-end SLA constraint stated in terms of minimum probability $\phi_a$ that the overall end-to-end response-time of the application $R_a$ stays within a deadline $d_a$: $Pr\{R_a \leq d_a\} \geq \phi_a$.

The variability of execution times defined by the expression e is useful for leveraging the framework to model possibly different known computing time estimates in various scenarios, or for leveraging a known probability mass function of the computing times distribution.

Also, each component may either be fixed into a specific location, or its location may have to be determined in the present problem formulation. In this view, both storage elements and the client-side parts of the applications may be considered as application components, which are typically already placed at some cloud storage premises or user locations, respectively.

For the purposes of this discussion, the network may be characterized by the latency matrix $[W_{h,k}]_{h,k \in L}$ and a network capacity matrix $[U_{h,k}^N]_{h,k \in L}$ that define, given any two locations h, k∈L, the latency (estimation or upper bound) $W_{h,k} \in R$ and the available bandwidth $U_{h,k}^N$ (estimation or lower bound) between them. Also, for each location h∈$L_V$ we may know what is the available computing power $U_h^C$ and available storage capacity $U_h^S$. These matrices and performance information may be obtained using various known methods, e.g., by exploiting the Application-Layer Traffic Optimization (ALTO) series of standards.

The problem described as follows is how to place the components of applications in A over the data centers in V, i.e., over their locations $L_V$, so as to satisfy specific probabilistic latency constraints based upon the collective latency constraints.

The problem variables are the Booleans $\{x_{a,i,h}\}_{a \in A, i \in A_a, h \in L_V}$ defining, for each application a ∈A and its component i∈$A_a$, whether or not the component is placed on the location h∈$L_V$ corresponding to a specific data center. For those components whose location is actually known (e.g., client-side parts of the applications or storage elements whose location cannot be changed), the corresponding $x_{a,i,h}$ notation actually denotes a constant of the problem (with value 1 if the component i∈$A_a$ is placed in data center h and 0 otherwise).

The $\{x_{a,i,h}\}_{i \in A_a, h \in L}$ variables are subject to the constraint that each service must be placed at one single location:

$$\sum_{h \in V} x_{a,i,h} = 1 \quad \forall a \in A, \forall i \in A_a. \tag{1}$$

The overall end-to-end application response-time $R_a$ may be expressed as the sum of network latency terms, network transmission latency and computing latency, as described below.

The network latency $L_{a,i,h}^N$ between two components i, j∈$A_a$ may be expressed as:

$$L_{a,i,j}^N = \sum_{h,k \in V} W_{h,k} x_{a,i,h} x_{a,j,h}. \tag{2}$$

The transmission latency $L_{a,i,j,e}^T$ needed to transmit the message between i and j, of size $M_{a,i,e}$, over a known (and reserved) bandwidth $B_{a,i,j}$ (this may be picked as a standard bandwidth assignment, e.g., 1 Mb/s or similar) may be expressed as:

$$L_{a,i,h}^{T} = \frac{M_{a,i,e}}{B_{a,i,e}}. \qquad (3)$$

Now it is possible to formally define the set of probabilistic latency constraints.

A probabilistic latency constraint $e \in E_a$ (each application may have more such constraints associated with it) involving users and services may be expressed as a linear combination of $T_{a,e}$ latency terms, where each term $t=1, \ldots, T_{a,e}$ is characterized by a pair of known components $i_{a,e,t}, j_{a,e,t} \in A_e$ and an integer weight $r_{a,e,t}$ (modeling how many interactions between $i_{a,e,t}$ and $j_{a,e,t}$ are considered in the latency expression). So, the set of latency constraints $E_a$ may be expressed as:

$$\sum_{t=1, i=i_{a,e,t}, j=j_{a,e,t}}^{T_{a,e}} C_{a,i,e} + \frac{M_{a,i,e}}{B_{a,i,e}} + r_{a,e,t}\left[\sum_{h,k \in V} W_{h,k} x_{a,i,h} x_{a,j,h}\right] \leq d_{a,e}. \qquad (4)$$

Now, given that the various scenarios do not occur all with the same probability, but for each scenario $e \in E_a$ the probability $\phi_a$, of its occurrence is known, then a subset of latency constraints/scenarios may be identified that satisfy the just mentioned constraint and whose overall probability of occurrence exceeds the SLA value $\phi_a$ for the overall application.

For this purpose, define the Booleans $y_{a,e}$ encoding whether or not the expression $e \in E_a$ in the end-to-end latency constraints f or application $a \in A$ is considered. Then, the placement problem may be formally defined as:

$$\begin{cases} y_{a,e} \left\{ \sum_{i=i_{a,e,t}, j=j_{a,e,t}}^{T_{a,e}} C_{a,i,e} + \frac{M_{a,i,e}}{B_{a,i,j}} + \frac{M_{a,i,e}}{B_{a,i,j}} + r_{a,e,t}\left[\sum_{h,k \in V} W_{h,k} x_{a,i,h} x_{a,j,k}\right] \right\} \leq d_a & \forall a \in A, \forall e \in E_a \\ \sum_{e \in E_a} y_{a,e} \phi_{a,e} \geq \phi_a \\ \sum_{h \in V} x_{a,i,h} = 1 & \forall a \in A, \forall i \in A_a \\ \sum_{a \in A} \sum_{i \in A_a} x_{a,i,h} \frac{\max_{e \in E_a} C_{a,i,e}}{T_a} \leq U_h^C & \forall h \in L_V \\ \sum_{a \in A} \sum_{i,j \in A_a} x_{a,i,h} x_{a,j,k} B_{a,i,j} \leq U_{h,k}^N & \forall h, k \in L_V \\ \frac{\max_{e \in E_a} M_{a,i,e}}{T_a} \leq B_{a,i,j} & \forall a \in A, \forall i \in A_a \\ \sum_{a \in A} \sum_{i \in A_a} S_{a,i} x_{a,i,h} \leq U_h^S & \forall h \in L_V \end{cases}$$

where:

the first row represents the end-to-end latency constraints (parameterized with the scenario selection variables $\{y_{a,e}\}$);

the second row represents the scenario selection constraints for choosing a set of $\{y_{a,e}\}$ variables satisfying the minimum SLA probability constraint $\phi_a$;

the third row represents the allocation constraints requiring that each application component be placed exactly in one location;

the fourth row represents the computing constraints, such that the overall computing workload assigned to each location does not exceed the available amount $U_h^C$; in case the same component has different computing requirements specified for each scenario, then the maximum among them may be considered;

the fifth row represents the bandwidth occupation constraints;

the sixth row constrains the assigned network bandwidth for all components communications to match the requirements as known in the various scenarios; and the seventh and last row represents the storage constraints, such that the overall computing workload assigned to each location does not exceed the available amount $U_h^S$.

The above may be translated into a form of Boolean Linear Programming optimization program that may be solved by a standard solver, once a suitable linear objective function is defined (e.g., associating a cost for hosts/locations computing capacity and location-to-location communication resources that get occupied). In order to simplify the problem, one simple possibility is to fix ahead of time the set of scenarios/constraints to consider, namely pick some constants for the $\{y_{a,e}\}$ variables, then try to solve the problem, and if it has no solutions, try with a different set of scenarios etc. If the method stops as soon as it finds a solution, then a sub-optimum solution may result.

Figure 3:
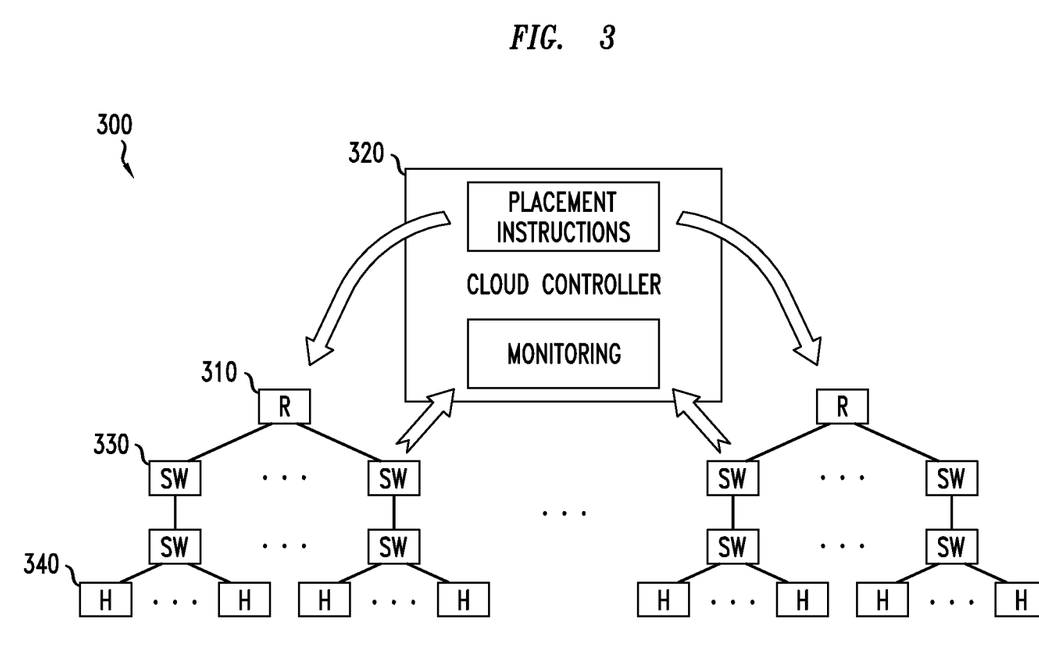
FIG. 3 illustrates an embodiment of the cloud application placement system.

FIG. 3 illustrates an embodiment of the cloud application placement system. The cloud application placement system 300 includes a cloud controller 320, routers 310, switches 330, and hosts 340. The cloud controller 320 may include a processor implementing placement instructions to control the placement of the cloud application on the hosts 340 as described above. Further, the cloud controller 320 may monitor the network to receive various network performance data used in the placement method as described above. Such network performance data may include network latency, host processing performance and availability, network bandwidth, etc. The cloud controller 320 may be connected to routers 310. The routers 320 may then be connected to switches 330 that switch traffic through the cloud network. Finally, the switches 330 may be connected to a plurality of hosts 340 that are used to implement the cloud application. The routers 320 and switches 330 provide network connectivity between the cloud controller 320 and the hosts 340. The hosts 340 may include computer processing, memory, storage, etc. Further, the hosts may provide a unique service, for example a database, that is at a fixed location.

Figure 4:
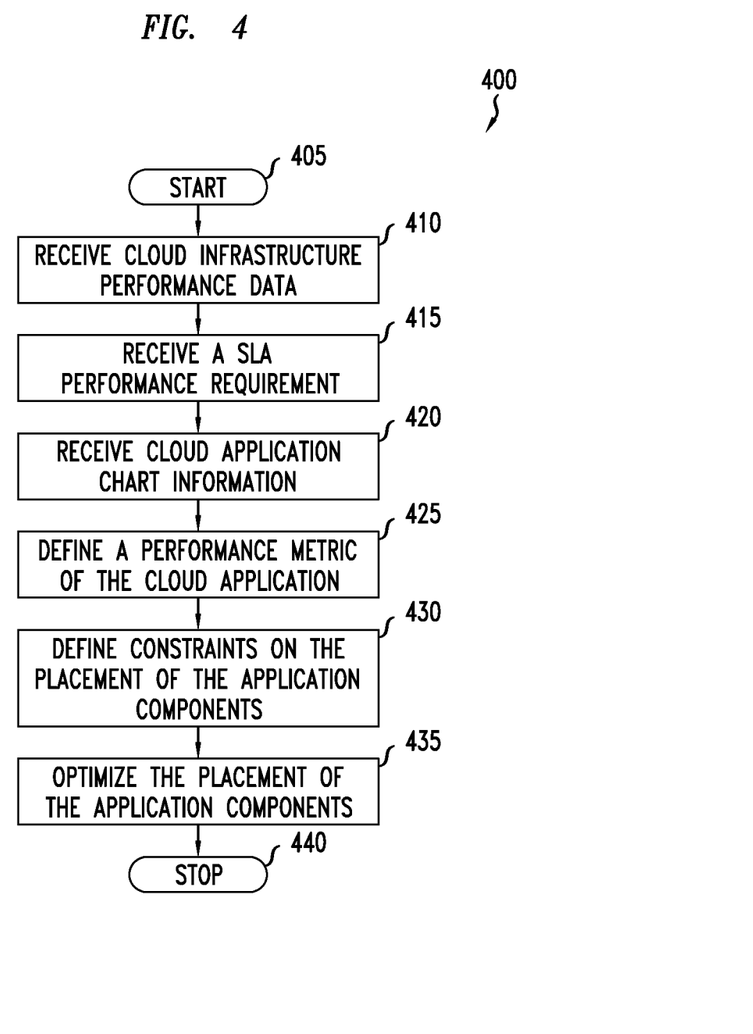
FIG. 4 illustrates a flow diagram for an embodiment of the cloud application placement method.

FIG. 4 illustrates a flow diagram for an embodiment of the cloud application placement method. The method described in FIG. 4 may be implemented on the cloud controller, which will be used in the example below, or on any other processor available to the cloud network. The method may begin at step 405. Next, the cloud controller may receive cloud system performance data 410. For example such data may include the network capacity matrix, which may include the latency and available bandwidth between any two locations, available computing power, available storage, etc. Next, the cloud controller may receive the SLA performance requirement(s) 415. Such SLA performance requirement may include, for example, an application response time. Such response time may also be associated with a probability specifying that such response time will be met with the specified probability. Other performance requirements, especially those related to QoS, may also be provided. The cloud controller may next receive cloud application chart information 420. As described above, such cloud application chart information may define various components of the application, the interaction of the components, the order of execution of the components, scenarios describing the various combination of components that may be needed to respond to a user request, probabilities that any scenario may be used, etc.

Next, the cloud controller may define a performance metric of the cloud application 425. As in the example above an end-to-end application response-time may be defined. The cloud controller may next define constraints on the placement of the application components 430. Various examples of such constraints are described above. Next, the cloud controller may optimize the placement of the application components 435. This optimization may seek to find a placement of the application components on the existing and available hosts to meet the SLA requirement based upon the defined constraints. As described above various methods may be known to carry out such an optimization. The method 400 may then end at step 440. While the steps of the method 400 are described in a certain order, various of the steps may be performed in any order or even simultaneously where possible. For example, steps 410, 415, and 420 may be performed in any order. Also, steps 425 and 430 may be performed in any order.

Figure 5:
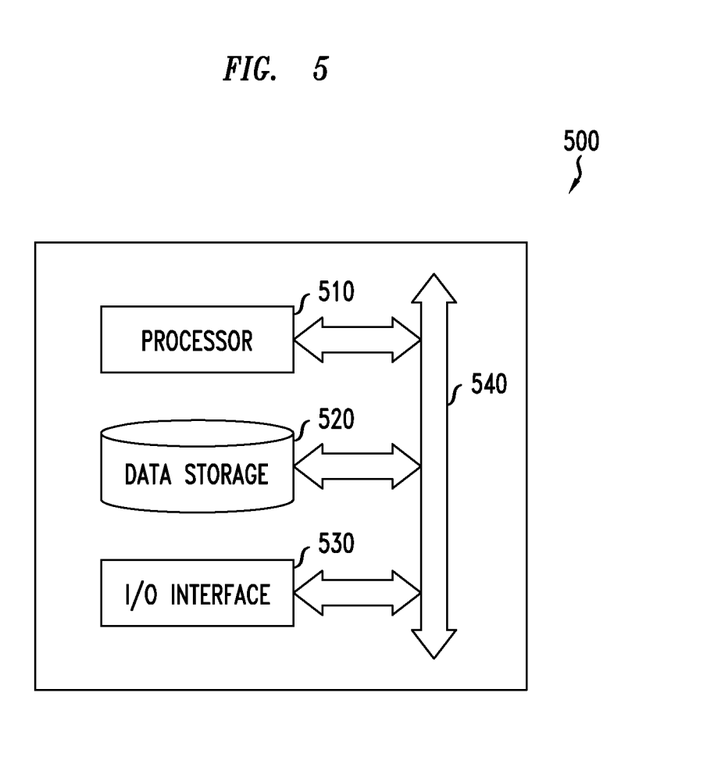
FIG. 5 illustrates a hardware diagram of an exemplary cloud controller.

FIG. 5 illustrates a hardware diagram of an exemplary cloud controller. The exemplary cloud controller 500 may correspond to the exemplary cloud controllers 120 or 320 described above. The cloud controller 500 may include a processor 510, a data storage 520, an input/output (I/O) interface 530, and system bus 540.

The processor 510 may control the operation of the cloud controller and cooperate with the data storage 520 and the I/O interface 530, via a system bus 540. As used herein, the term "processor" will be understood to encompass a variety of devices such as microprocessors, field-programmable gate arrays (FPGAs), application-specific integrated circuits (ASICs), and other similar processing devices.

The data storage 520 may store program data such as various programs useful to carry out the method 400 as described above.

The I/O interface 530 may cooperate with the processor 510 to support communications over one or more communication channels. For example, the I/O interface 530 may include a user interface, such as a keyboard and monitor, and/or a network interface, such as one or more Ethernet ports.

In some embodiments, the processor 510 may include resources such as processors/CPU cores, the I/O interface 530 may include any suitable network interfaces, or the data storage 520 may include memory or storage devices. Moreover the cloud controller 500 may be any suitable physical hardware configuration such as: one or more servers or blades consisting of components such as processor, memory, network interfaces or storage devices. In some of these embodiments, the cloud controller 500 may include network resources that are remote from each other.

In some embodiments, the cloud controller 500 may include one or more virtual machines. In some of these embodiments, a virtual machine may include components from different physical machines or be geographically dispersed. For example, the data storage 520 and the processor 510 may reside in two different physical machines. In some embodiments, the cloud controller 500 may be a general purpose computer programmed to perform the methods described herein. When processor-executable programs are implemented on a processor 510, the program code segments combine with the processor to provide a unique device that operates analogously to specific logic circuits.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for placing components of a plurality of instances of a cloud application on nodes in a cloud infrastructure, the method comprising:
   receiving by a cloud controller scenario probabilities of a plurality of cloud application scenarios, wherein the plurality of cloud application scenarios define which of a plurality of application components to use and an order of operation for the plurality of application components;
   receiving by a cloud controller cloud infrastructure performance data;
   defining a performance metric of the cloud application based upon cloud infrastructure performance data;
   defining constraints on the placement of the plurality of application components;
   receiving a service level agreement performance requirement based upon a probability of meeting a specified performance requirement;
   optimizing the placement of the plurality of application components of the plurality of instances of the cloud application on nodes in the cloud infrastructure based upon the scenario probabilities, cloud infrastructure performance data, the performance metric, and the constraints on the placement of the plurality of application components to meet the service level agreement performance requirement.

2. The method of claim 1, wherein performance metric is an end-to-end latency of the cloud application and the service level agreement performance requirement is an application response time.

3. The method of claim 2, wherein end-to-end latency of the cloud application includes a message transmission latency.

4. The method of claim 2, wherein end-to-end latency of the cloud application includes a computation latency.

5. The method of claim 2, wherein end-to-end latency of the cloud application includes a storage latency.

6. The method of claim 1, wherein the cloud infrastructure performance data includes a network latency matrix defining the latency between each available node in the cloud computing infrastructure.

7. The method of claim 1, wherein the constraints on the placement of the application components includes one of computing constraints, bandwidth constraints, and storage constraints.

8. The method of claim 1, further comprising receiving computation times and probabilities for a cloud computing application component wherein the optimizing the placement of the components is further based upon the computation times and probabilities for the cloud computing application.

9. A cloud controller method for placing components of a plurality of instances of a cloud application on nodes in a cloud infrastructure the cloud controller comprising:
a network interface;
a memory; and
a processor in communication with the memory, the processor being configured to:
receive scenario probabilities of a plurality of cloud application scenarios, wherein the plurality of cloud application scenarios define which of a plurality of application components to use and an order of operation of the plurality for application components;
define a performance metric of the cloud application based upon cloud infrastructure performance data;
define constraints on the placement of the plurality of application components;
receive a service level agreement performance requirement based upon a probability of meeting a specified performance requirement;
optimize the placement of the components of the plurality of instances of the cloud application on nodes in the cloud infrastructure based upon the scenario probabilities, cloud infrastructure performance data, the performance metric, and the constraints on the placement of the plurality of application components to meet the service level agreement performance requirement.

10. The cloud controller of claim 9, wherein performance metric is an end-to-end latency of the cloud application and the service level agreement performance requirement is an application response time.

11. The cloud controller of claim 10, wherein end-to-end latency of the cloud application includes one of a message transmission latency, a computation latency, and a storage latency.

12. The cloud controller of claim 9, wherein the cloud infrastructure performance data includes a network latency matrix defining the latency between each available node in the cloud computing infrastructure.

13. The cloud controller of claim 9, wherein the constraints on the placement of the application components includes one of computing constraints, bandwidth constraints, and storage constraints.

14. A non-transitory machine-readable storage medium encoded with instructions for execution by a cloud controller for placing components of a plurality of instances of a cloud application on nodes in a cloud infrastructure, the medium comprising:

instructions for receiving scenario probabilities of a plurality of cloud application scenarios, wherein the plurality of cloud application scenarios define which of a plurality of application components to use and an order of operation for the plurality of application components;
instructions for receiving cloud infrastructure performance data;
instructions for defining a performance metric of the cloud application based upon cloud infrastructure performance data;
instructions for defining constraints on the placement of the plurality of application components;
receiving a service level agreement performance requirement based upon a probability of meeting a specified performance requirement;
instructions for optimizing the placement of the components of the plurality of instances of the cloud application on nodes in the cloud infrastructure based upon the scenario probabilities, cloud infrastructure performance data, the performance metric, and the constraints on the placement of the plurality of application components to meet the service level agreement performance requirement.

15. The non-transitory machine-readable storage medium of claim 14, wherein performance metric is an end-to-end latency of the cloud application and the service level agreement performance requirement is an application response time.

16. The non-transitory machine-readable storage medium of claim 15, wherein end-to-end latency of the cloud application includes a message transmission latency.

17. The non-transitory machine-readable storage medium of claim 15, wherein end-to-end latency of the cloud application includes a computation latency.

18. The non-transitory machine-readable storage medium of claim 15, wherein end-to-end latency of the cloud application includes a storage latency.

19. The non-transitory machine-readable storage medium of claim 14, wherein the cloud infrastructure performance data includes a network latency matrix defining the latency between each available node in the cloud computing infrastructure.

20. The non-transitory machine-readable storage medium of claim 14, wherein the constraints on the placement of the application components includes one of computing constraints, bandwidth constraints, and storage constraints.

* * * * *